United States Patent
Lee et al.

(10) Patent No.: US 11,043,338 B2
(45) Date of Patent: Jun. 22, 2021

(54) MANUFACTURING METHOD OF POROUS COMPOSITE ELECTRODE AND ORGANIC REMOVAL METHOD OF POROUS COMPOSITE ELECTRODE

(71) Applicant: KOREA RESEARCH INSTITUTE OF CHEMICAL TECHNOLOGY, Daejeon (KR)

(72) Inventors: Sun Sook Lee, Daejeon (KR); Ki-Seok An, Daejeon (KR); Jongsun Lim, Daejeon (KR); Sung Myung, Daejeon (KR); Wooseok Song, Daejeon (KR); Jin Kyu Han, Jeonju-si (KR); Ha Kyun Jung, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 16/186,357

(22) Filed: Nov. 9, 2018

(65) Prior Publication Data

US 2019/0139715 A1    May 9, 2019

(30) Foreign Application Priority Data

Nov. 9, 2017   (KR) .................. 10-2017-0148687
Nov. 7, 2018   (KR) .................. 10-2018-0136004

(51) Int. Cl.
| | |
|---|---|
| B05D 3/02 | (2006.01) |
| H01G 11/86 | (2013.01) |
| H01G 11/26 | (2013.01) |
| H01G 11/38 | (2013.01) |
| G01N 27/30 | (2006.01) |
| G01N 27/407 | (2006.01) |

(52) U.S. Cl.
CPC ............ *H01G 11/86* (2013.01); *B05D 3/029* (2013.01); *G01N 27/308* (2013.01); *H01G 11/26* (2013.01); *H01G 11/38* (2013.01); *G01N 27/4075* (2013.01)

(58) Field of Classification Search
CPC .. B05D 3/029; B05D 3/148; H01G 11/32–44; H01G 11/86; H01G 11/26; H01G 11/38; H01G 11/24; G01N 27/308; G01N 27/4075
USPC .............. 427/534, 543, 544, 553, 557, 559; 219/678–763; 216/69; 34/259, 262–265; 204/157.43, 157.47
See application file for complete search history.

(56) References Cited

U.S. PATENT DOCUMENTS

| | | | | |
|---|---|---|---|---|
| 8,563,150 B2* | 10/2013 | Bugnet | ................ | H01M 4/244 429/57 |
| 10,026,965 B2* | 7/2018 | Shim | ................ | H01G 11/36 |
| 10,756,347 B2* | 8/2020 | Sakshaug | ................ | H01M 4/362 |
| 2006/0237034 A1* | 10/2006 | Shore | ................ | H01M 8/008 134/10 |
| 2008/0003489 A1* | 1/2008 | Bugnet | ................ | H01M 10/28 429/57 |
| 2009/0131703 A1* | 5/2009 | Jhung | ................ | C07F 11/005 556/44 |
| 2009/0142647 A1* | 6/2009 | Sugi | ................ | D01D 5/0007 429/532 |
| 2011/0256454 A1* | 10/2011 | Nicolas | ................ | C04B 26/08 429/232 |
| 2015/0030856 A1* | 1/2015 | Singh | ................ | B82Y 30/00 428/408 |
| 2015/0205040 A1* | 7/2015 | Winarski | ................ | G02B 6/25 385/128 |
| 2015/0340170 A1* | 11/2015 | Jun | ................ | C01G 53/04 361/502 |
| 2016/0101979 A1* | 4/2016 | Hocke | ................ | C23C 16/442 428/403 |
| 2017/0125818 A1* | 5/2017 | Shim | ................ | H01M 4/663 |
| 2017/0170477 A1* | 6/2017 | Sakshaug | ................ | H01M 4/0416 |
| 2018/0166689 A1* | 6/2018 | Nicolas | ................ | C04B 26/08 |
| 2018/0261882 A1* | 9/2018 | Chang | ................ | H01M 2/16 |
| 2019/0093217 A1* | 3/2019 | Loeblein | ................ | C23C 16/0281 |
| 2019/0237269 A1* | 8/2019 | Fan | ................ | H01G 11/08 |

FOREIGN PATENT DOCUMENTS

| | | |
|---|---|---|
| JP | 2009-076514 A | 4/2009 |
| KR | 10-2007-0019944 A | 2/2007 |
| KR | 10-2009-0124209 A | 12/2009 |
| KR | 10-2015-0128056 A | 11/2015 |

OTHER PUBLICATIONS

E.M. Purcell; electricity and magnetism, Berkeley physics course—vol. 2; Education Development Center, Inc., Newton, Massachusetts; 1965 (no month); pp. 95-108 & back cover's 2 pages of unit listings.*
Derwent abstract Acc.# 2018-04629V, week 201873 of Fan et al. ,CN 107564736 A, published Jul. 31, 2017.*
Derwent abstract Acc.# 2017-763138, week 201906 of Fan et al., CN 107316749 A, published Jul. 31, 2017.*
Office Action of corresponding Korean Patent Application No. 10-2018/0136004—5 pages (dated Nov. 14, 2019).
Sun et al., "Electrochemical Characteristics of the Activated Carbon Electrode Modified with the Microwave Radiation in the Electric Double Layer Capacitor", Appl. Chem. Eng., vol. 21, No. 1—7 pages. (Feb. 2010), English abstract only; No translation.

* cited by examiner

*Primary Examiner* — Dah-Wei D. Yuan
*Assistant Examiner* — Nga Leung V Law
(74) *Attorney, Agent, or Firm* — Knobbe Martens Olson & Bear LLP (57) ABSTRACT

A method of manufacturing a porous composite electrode including: preparing an ink including a carbon material and a binder; coating a substrate with the ink to manufacture a composite electrode; and irradiating the composite electrode with microwave to remove the binder and an organic material, and a method of removing an organic material of a porous composite electrode.

8 Claims, 10 Drawing Sheets

MANUFACTURING METHOD OF POROUS COMPOSITE ELECTRODE AND ORGANIC REMOVAL METHOD OF POROUS COMPOSITE ELECTRODE

CROSS-REFERENCE TO RELATED APPLICATIONS

This application claims priority under 35 U.S.C. § 119 to Korean Patent Application No. 10-2017-0148687, filed on Nov. 9, 2017, and Korean Patent Application No. 10-2018-0136004, filed on Nov. 7, 2018, in the Korean Intellectual Property Office, the disclosure of each of which is incorporated herein by reference in its entirety.

TECHNICAL FIELD

The following disclosure relates to a method of manufacturing a porous composite electrode, and a method of removing an organic material of a porous composite electrode.

BACKGROUND

With the development of various next-generation electronic devices, efforts to implement miniaturization and high efficiency of energy/sensor devices have been accelerated. In general, porous carbon materials are widely used as electrode materials for super capacitors and electrochemical gas sensors. In recent years, however, studies have been actively conducted to apply low-dimensional carbon nanomaterials such as carbon nanotubes or graphene having excellent electrical, mechanical, and physical/chemical properties to energy/sensor device electrodes for miniaturized high-performance devices. According to the development of the electrode material as described above, the importance of a porous material has been emphasized in order to enhance reactivity and efficiency due to its high specific surface area.

As an example, Korean Patent Laid-Open Publication No. 10-2009-0124209 discloses that a carbon nanotubes powder is prepared to have a porous structure having a macro-sized pore and nanoscale pore structure.

The disclosure of this section is to provide background of the invention. Applicant notes that this section may contain information available before this application. However, by providing this section, Applicant does not admit that any information contained in this section constitutes prior art.

SUMMARY

One aspect of the invention provides a method of manufacturing a porous composite electrode in which a binder, which is an organic material in a composite electrode, is selectively removed by microwave irradiation, and a method of removing an organic material from a porous composite electrode. An embodiment of the present invention is directed to providing a porous composite electrode from which a binder is selectively removed by irradiating a composite electrode with microwaves, the composite electrode being manufactured with an ink including a porous carbon material and a binder.

Another embodiment of the present invention is directed to providing a porous composite electrode manufactured by a low-temperature process using microwaves applicable to a super capacitor electrode or an electrochemical gas sensor.

In one general aspect, a method of manufacturing a porous composite electrode, the method including: a) preparing an ink including a carbon material and a binder; b) coating a substrate with the ink to manufacture a composite electrode; and c) irradiating the composite electrode with microwave to selectively remove the binder.

In the c) irradiating of the composite electrode, the microwaves may be irradiated at an irradiation intensity of 600 to 1,000 W.

In the c) irradiating of the composite electrode, the microwaves may be irradiated for 1 to 60 minutes.

The method may further include, after the c) irradiating of the composite electrode, removing the substrate.

The porous composite electrode may have a capacitance increase rate satisfying the following Formula 1:

$$4 \leq \frac{C_1 - C_0}{C_0} \times 100 \leq 40 \qquad \text{[Formula 1]}$$

in Formula 1,
$C_1$ is a capacitance of the porous composite electrode from which the binder is removed by the microwave irradiation, and $C_0$ is a capacitance of the porous composite electrode before the microwave irradiation.

The porous composite electrode may have a specific surface area increase rate satisfying the following Formula 2:

$$15 \leq \frac{BET_1 - BET_0}{BET_0} \times 100 \leq 70 \qquad \text{[Formula 2]}$$

in Formula 2,
$BET_1$ is a specific surface area of the porous composite electrode from which the binder is removed by the microwave irradiation, and $BET_0$ is a specific surface area of the porous composite electrode before the microwave irradiation.

The carbon material may be a composite of a carbon-based compound and platinum.

In another general aspect, a method of removing an organic material of a porous composite electrode includes: removing a binder by microwave irradiation of a composite electrode, the composite electrode being manufactured with an ink including a carbon material and a binder.

DETAILED DESCRIPTION OF EMBODIMENTS

Hereinafter, a method of manufacturing a porous composite electrode, and a method of removing an organic material of a porous composite electrode according to embodiments of the present invention are described in more detail through embodiments. It should be understood, however, that the following embodiments are only illustrative of the present invention in detail, and the present invention is not limited thereto and may be implemented in various forms.

In addition, unless defined otherwise, all technical and scientific terms used herein have the same meanings as commonly understood by one skilled in the art to which the present disclosure pertains. Terms used herein have purposes of describing particular embodiments only and are not intended to limit the present invention.

As used herein, the term "composite electrode" may be a carbon composite electrode including a carbon material according to an embodiment of the present invention.

As used herein, the term "porous composite electrode" may be a porous carbon composite electrode including a carbon material according to an embodiment of the present invention.

In the case of a porous carbon electrode used for a supercapacitor, an electrochemical gas sensor or the like, a binder, a solvent, and a surfactant are generally used together. In order to remove the binder, the solvent, and the surfactant, a heat treatment process is typically used. However, when the binder is removed through the heat treatment as described above, the carbon materials are chemically modified inevitably or the substrate is also deformed.

A method of manufacturing the porous material includes forming pores in spaces between intrinsic pores of the carbon material and controlling pore distribution according to porosity and a size of the carbon material. In order to control the pores, the carbon material is manufactured to have porosity through various methods, thereby improving specific capacitance.

However, when a carbon material having a porous property is prepared and a carbon electrode is manufactured, a binder and a solvent are additionally used. After the formation of a film, a heat treatment is adopted to remove the binder and the solvent. However, the carbon materials undergo inevitable chemical modification during the heat treatment, causing reduction of porosity and electrical conductivity.

In embodiments, a porous composite electrode is manufactured by microwave irradiation without a high temperature heat treatment process to effectively remove a binder through a selective energy absorption process of the composite electrode without deformation of the substrate. As a result, electric capacity, a specific surface area, and electrical conductivity were significantly improved, thus resulting in significant improvement of capacitance, the porous composite electrode was fixed without the binder to maintain a shape, and the manufacturing time was remarkably shortened.

Embodiments of present invention provide a method of manufacturing a porous composite electrode, and a method of removing an organic material of a porous composite electrode.

The present disclosure is described in detail.

The method of manufacturing a porous composite electrode according to embodiments of the present invention may include: a) preparing an ink including a carbon material and a binder; b) coating a substrate with the ink to manufacture a composite electrode; and c) irradiating the composite electrode with microwaves to selectively remove the binder.

In the porous composite electrode manufactured by the manufacturing method of embodiments of the present invention, the binder may be effectively removed without any deformation of the substrate through a selective energy absorption process by the microwave irradiation, and thus capacitance, a specific surface area, and electrical conductivity may be significantly improved and the manufacturing time may be remarkably shortened.

According to an embodiment of the present invention, an ink including a carbon material and a binder may be manufactured in step a).

According to an embodiment of the present invention, the carbon material may include any one or two or more carbon-based compounds selected from activated carbon powder, activated carbon fiber, single-walled carbon nanotubes, multi-walled carbon nanotubes, carbon black, carbon aerogel, single-layer graphene, and multi-layer graphene, with excellent specific surface area. Preferably, the carbon material may be any one or a mixture of two or more selected from single-walled carbon nanotubes, multi-walled carbon nanotubes, single-layer graphene, and multi-layer graphene. When the carbon material is used and applied to a capacitor, the carbon material may have pores with a suitable size so that organic electrolyte ions are easily movable into inner pores of the carbon material.

According to an embodiment of the present invention, the carbon material may be a composite of a carbon-based compound and platinum. When the composite of carbon-based compound and platinum is included as the carbon material, capacitance, specific surface area, and electrical conductivity may be remarkably improved while ensuring porosity. The composite may be composed by including 10 to 90 wt % of the carbon-based compound and 10 to 90 wt % of the platinum, but is not limited thereto.

According to an embodiment of the present invention, when the porous composite electrode includes the above-described composite of a carbon-based compound and platinum as the carbon material, sensitivity to gas may be excellent, and flexibility and durability may be excellent.

Further, according to an embodiment of the present invention, unlike the high-temperature heat treatment causing the contraction and deformation of the substrate, the binder may be effectively removed without any deformation of the substrate from the porous composite electrode by including the composite of a carbon-based compound and platinum and irradiating the substrate with microwaves, and thus the capacitance, the specific surface area, and the electrical conductivity may be significantly improved and the manufacturing time may be remarkably shortened. In addition, the porous composite electrode may be excellent as an electrode for a gas sensor due to excellent sensitivity to gas.

According to an embodiment of the present invention, the carbon material may have pores having a pore size of 0.3 to 5 nm, and preferably may include pores having a pore size of 1.2 to 2.5 nm in an amount of 30% or more of the total pore volume. Since an actual capacitance in a general organic electrolyte depends on the fraction of pores having a pore size of 1 nm or more, it is difficult for the carbon materials, in which most of the parts have pores having a pore size of 1 nm or less, to implement a capacitance. In addition, when dispersibility with a binder is not easily achieved without a surfactant, it is difficult to implement excellent characteristics of the electrode. Thus, it is advantageous to use the carbon material having the pore size as described above since the dispersibility with the binder may be improved, organic electrolyte ions may be easily transferred to contribute to implementation of a high capacitance, high-efficiency discharge, and high-speed charge/discharge characteristics, and low-temperature characteristics may be improved.

Further, according to an embodiment of the present invention, the specific surface area of the carbon material may be 400 to 2,000 $m^2/g$, but is not limited thereto. The carbon material having the specific surface area as described above is advantageous since dispersibility with the binder may be excellent without a surfactant and a filling density of an active material may be high, and thus a content of the active material per electrode volume may increase to improve specific capacity of electrode per volume, thereby resulting in achieving high capacitance characteristics.

When attempting to improve the electrostatic capacitance by forming pores in a space between the intrinsic pores of the carbon material and controlling the pore distribution according to porosity and a size of the carbon material, it is not easy to control the pores through typical processes such as heat treatment, and the like.

According to an embodiment of the present invention, the binder may be any one or a mixed resin of two or more selected from fluorinated polymers including polytetrafluoroethylene (PTFE), polyvinylidene fluoride (PVDF), and the like; conductive polymers including polyaniline (PANI), polypyrrole (PPy), and the like; and polyvinyl acetate (PVA) and the like. Specifically, the binder may preferably be polytetrafluoroethylene (PTFE). It is advantageous to use the above-listed binders since it is possible to selectively remove the binder when the microwaves are irradiated.

According to an embodiment of the present invention, the carbon material may have a content of 80 to 95 wt % and the binder may have a content of 5 to 20 wt %. Specifically, the carbon material may have a content of 85 to 95 wt % and the binder may have a content of 5 to 15 wt %. In embodiments, the carbon material and the binder have the above-described contents are advantageous, since a selective removal efficiency of the binder is excellent, a porous structure is maintained, and the capacitance, the specific surface area, and the electrical conductivity are significantly improved.

The method of manufacturing a porous composite electrode of embodiments of the present invention is advantageous since a surfactant is not included, it is not necessary to additionally perform a heat treatment step, thereby preventing deformation of the substrate, preventing closure of pores, and the like.

According to an embodiment of the present invention, in step b), the subsrate may be coated with ink to manufacture a composite electrode.

According to an embodiment of the present invention, the substrate may be a porous substrate or a film, specifically, a three-dimensional metal porous substrate or a gas-permeable polymer film. Preferably, the substrate may be a foam type substrate. More preferably, the substrate may be a metal foam substrate. Specific examples thereof may include any one or two or more selected from nickel foam, copper foam, aluminum foam, titanium foam, and the like. Preferably, the substrate may be a nickel foam substrate. The above-described substrates are advantageous since the substrate has a porous structure that liquid permeates easily while simultaneously being easily removed by an etching solution selected from iron chloride ($FeCl_3$), hydrochloric acid (HCl), or the like.

According to an embodiment of the present invention, in step b), the substrate may be coated with ink to manufacture a composite electrode. A method of coating a substrate with an ink may be selected from a coating method, a spray method, a printing method, and the like. Specifically, examples of the above coating method may include a micro gravure coating method, a wire bar coating method, a direct gravure coating method, a die coating method, an immersion method, a spray coating method, a reverse roll coating method, a curtain coating method, a comma coating method, a knife coating method, a spin coating method, and the like. Specifically, the printing method may be performed by patterning using any one or two or more coating methods selected from embossed printing, offset printing, gravure printing, intaglio printing, rubber plate printing, screen printing, inkjet printing, and the like. However, the present invention is not limited thereto.

According to an embodiment of the present invention, the composite electrode after coating in step b) may be subjected to drying. The drying may be performed at a temperature of 60 to 1000 for 1 to 12 hours, but is not limited thereto.

According to an embodiment of the present invention, in step c), the binder may be removed by irradiating the composite electrode with microwaves.

A binder, a solvent, and a surfactant, which are used when manufacturing a porous carbon electrode used in a general super capacitor, an electrolytic chemical gas sensor, or the like, are used. In order to remove the electrode after manufacturing the electrode, a high-temperature heat treatment process may be used. However, when the binder or the surfactant is removed through the heat treatment as described above, a chemical state of the carbon materials is changed and the porosity and the electrical conductivity are reduced.

On the contrary, embodiments of the present invention may manufacture the porous composite electrode by irradiating the composite electrode with microwaves without performing the high-temperature heat treatment process to effectively remove the binder through a selective energy absorption process of the composite electrode without deformation of the substrate. Thus, the porous composite electrode of embodiments of the present invention may significantly improve the capacitance, specific surface area, and electrical conductivity, and may remarkably shorten the manufacturing time.

According to an embodiment of the present invention, in step c), the microwaves may be irradiated at an irradiation intensity of 600 to 1,000 W. Preferably, the microwaves may be irradiated at an irradiation intensity of 800 to 1,000 W. When the microwaves are irradiated at these irradiation intensities, it is possible to instantaneously generate heat selectively to the carbon material to prevent the formation of a high-temperature atmosphere and to remove the binder without deformation of the sample.

According to an embodiment of the present invention, in step c), the microwaves may be irradiated for 1 to 60 minutes. Preferably, the microwaves may be irradiated for 1 to 40 minutes. More preferably, the microwaves may be irradiated for 15 to 35 minutes so as to improve a removal efficiency of the binder. When the microwaves are irradiated for the irradiation time as described above, only the binder is capable of being selectively removed without deforming the sample and affecting the structure of the carbon material.

According to an embodiment of the present invention, the method of manufacturing a porous composite electrode may further include, after step c), removing the substrate. The porous composite electrode of embodiments of the present invention may maintain porosity without being affected by the etching solution, and the like, and may maintain excellent electrical characteristics even after the substrate is removed as described above.

According to an embodiment of the present invention, the porous composite electrode may have a specific surface area increase rate (%) satisfying the following Formula 2:

$$15 \leq \frac{BET_1 - BET_0}{BET_0} \times 100 \leq 70 \quad \text{[Formula 2]}$$

in Formula 2, $BET_1$ is a specific surface area of the porous composite electrode from which the binder is removed by the microwave irradiation, and $BET_0$ is a specific surface area of the porous composite electrode before the microwave irradiation. Preferably, the specific surface area increase rate may be 20 to 65%, and more preferably 25 to 60%. The method of manufacturing a porous composite electrode according to embodiments of the present invention may further improve the specific surface area of the porous composite electrode by the microwave irradiation to remove the binder.

In the porous composite electrode of embodiments of the present invention, the binder is selectively removed without causing structural deformation and damage to the carbon material and the substrate, and thus the porous structure may be formed to increase the specific surface area, thereby leading to maximal expansion of an interface between the electrode and an electrolyte interface. Thus, it is possible to facilitate a mass transfer of electrolyte ions that combine with electrolyte molecules and move, thereby increasing adsorption and desorption efficiencies of the electrolyte ions, and improving a storage capacity of the electrode.

According to an embodiment of the present invention, the porous composite electrode may have a capacitance increase rate satisfying the following Formula 1:

$$4 \leq \frac{C_1 - C_0}{C_0} \times 100 \leq 40 \quad \text{[Formula 1]}$$

in Formula 1, $C_1$ is a capacitance of the porous composite electrode from which the binder is removed by the microwave irradiation, and $C_0$ is a capacitance of the porous composite electrode before the microwave irradiation. Preferably, the capacitance increase rate may be 4 to 30%, and more preferably 10 to 30%.

The method of manufacturing a porous composite electrode of embodiments of the present invention may form the porous structure as the binder is selectively removed, thereby improving an ion transfer rate in the porous composite electrode, and achieving charging and discharging rates of a capacitor due to excellent reactivity.

The porous composite electrode of embodiments of the present invention may be manufactured by irradiating the composite electrode manufactured using an ink including a carbon material and a binder with microwaves to remove an organic material including the binder.

The carbon material may increase an efficiency of the electrode due to a high specific surface area. However, there is a limit to an increase in capacitance of the electrode only by the carbon material having such a high specific surface area.

Therefore, in order to develop a high-efficiency composite electrode, it is necessary to research a novel method of manufacturing an electrode capable of increasing an adsorption capacitance by controlling a surface structure of the electrode together with the study for constituent materials of the electrode. Accordingly, embodiments of the present invention may secure excellent capacitance, specific surface area, and electrical conductivity by manufacturing the composite electrode including the carbon material and the binder and performing microwave irradiation, thereby forming the porous structure without deforming the substrate and the carbon material.

The thus-manufactured porous composite electrode may be applied to super capacitors and electrochemical gas sensors according to excellent capacitance, specific surface area, and electrical conductivity.

Hereinafter, a method of manufacturing a porous composite electrode, and a method of removing an organic material of a porous composite electrode according to embodiments of the present invention are described in more detail through embodiments. It should be understood, however, that the following examples are only illustrative of the present invention in detail, and the present invention is not limited thereto, and may be implemented in various forms.

In addition, unless defined otherwise, all technical and scientific terms used herein have the same meanings as commonly understood by one skilled in the art to which the present disclosure pertains. Terms used herein have purposes of describing particular embodiments only and are not intended to limit the present invention.

Further, additives that are not specifically described in the specification may have a unit of wt %.

Example 1

A nickel foam (Changsha Liyuan New Material Co. Ltd., about 320 g/m² in area density, and about 1.2 mm in thickness) was cut into a circular shape having a diameter of 1.4 cm and then etched in a 1M HCl aqueous solution for 1 minute to remove impurities. Then, the obtained nickel foam was transferred to DI water, washed three times for 30 minutes by ultrasonic treatment, and then dried in a vacuum oven at 50□ for 1 hour.

Multi-layer graphene (GC750, grade C-750, specific surface area: 50 m²/g, about 10 layers, size: 100 nm to 2 μm): multi-layer carbon nanotubes (MWCNTs, CM150, Hanhwa Nanotech.):Polytetrafluoroethylene (PTFE)=70 (2.1 g):20 (0.6 g):10 (0.30 g) and N-methyl-2-pyrrolidone (NMP) (32.5 g), which are conditions in which the porous structure of the nickel foam is maintained when removing the nickel foam after coating thereon as confirmed by experiments, were put into a planetary mixer, mixed for 20 minutes at 1,700 rpm, and then mixed for 24 hours by a ball mill mixing method using a zirconium ball.

The nickel foam substrate prepared above was dip-coated in a prepared ink for 1 minute to coat the solution flatly without blocking the pores of the nickel foam. In addition, the nickel foam substrate was dried in a vacuum oven at a temperature of 90□ for 6 hours. The above-described method was repeated 5 times to manufacture a thoroughly coated GC750/MWCNTs/Ni foam. The manufactured foam was irradiated with 700 W of microwaves for 5 minutes (GC-MW5) to remove the nickel foam using a nickel etching solution at a temperature of 75° C., thereby manufacturing a GC750/MWCNTs porous composite electrode. In order to analyzing electrical characteristics, a symmetric coin cell was made as a sample and measured.

Example 2

Example 2 was performed in the same manner as in Example 1 except that the microwaves were irradiated for 10 minutes (GC-MW10).

Example 3

Example 3 was performed in the same manner as in Example 1 except that the microwaves were irradiated for 20 minutes (GC-MW20).

Example 4

Example 4 was performed in the same manner as in Example 1 except that the microwaves were irradiated for 30 minutes (GC-MW30).

Comparative Example 1

Comparative Example 1 was performed in the same manner as in Example 1 except that the microwaves were not irradiated (GC-MW0).

Experimental Example 1

Measurement of Specific Surface Area of Porous Composite Electrode

The specific surface area of the porous composite electrode irradiated with the microwaves were calculated by the Brunauer-Emmett-Teller (BET) method and the Barret-Joyner-Halenda (BJH) method using nitrogen adsorption/desorption at a liquid nitrogen temperature (−196° C.).

Figure 1:
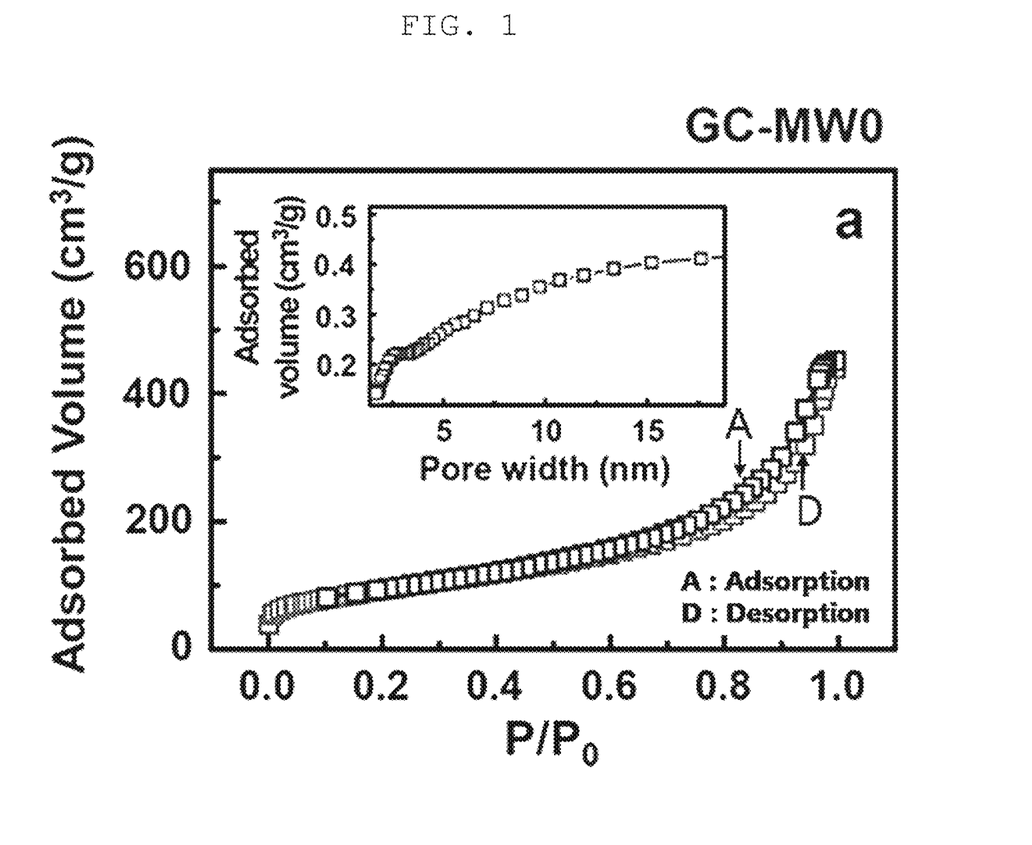
FIG. 1 shows analysis results of a specific surface area according to Comparative Example 1.
Figure 2:
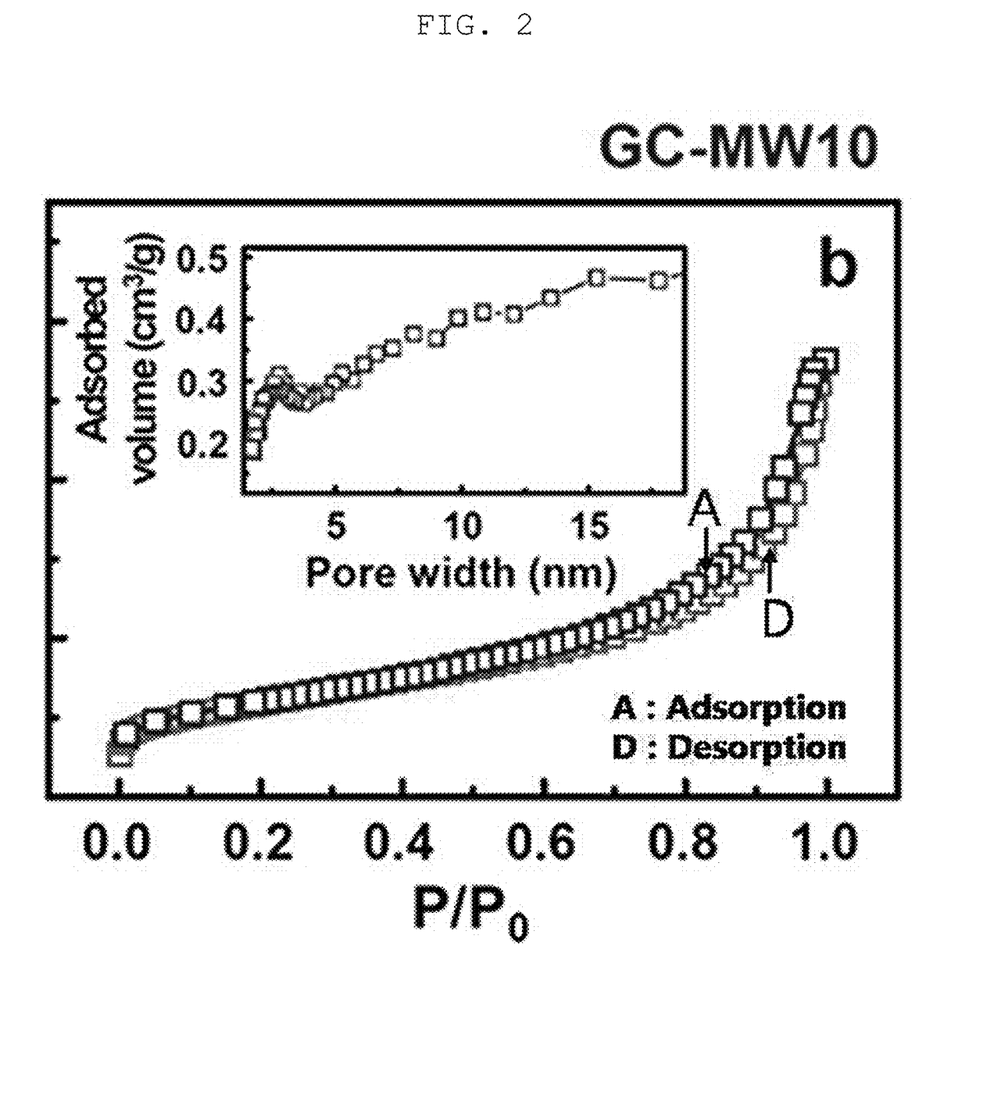
FIG. 2 shows analysis results of a specific surface area according to Example 2.
Figure 3:
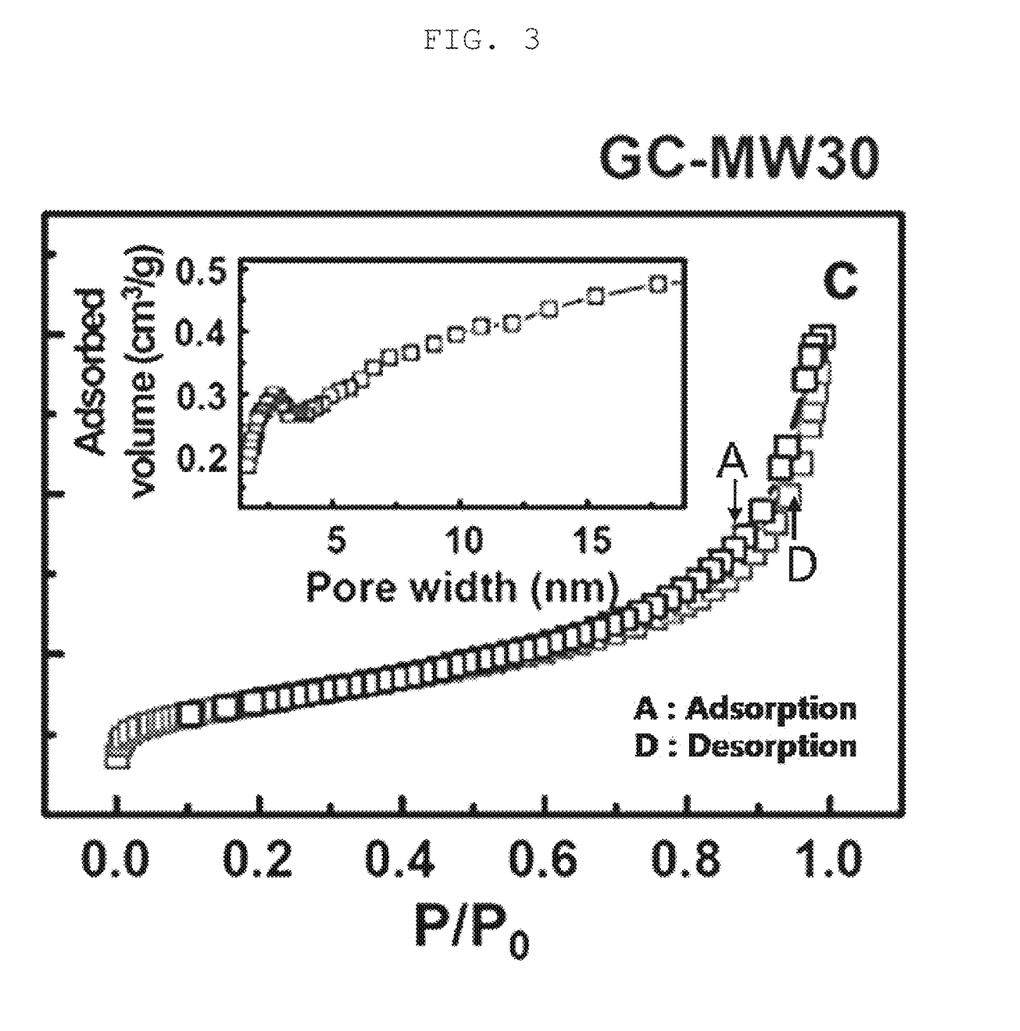
FIG. 3 shows analysis results of a specific surface area according to Example 4.

As shown in FIGS. 1 to 3, when the specific surface area of the composite electrode manufactured in Examples 2 and 4 and Comparative Example 1 was measured, it could be found that the specific surface area of Examples 2 and 4 was significantly improved compared to that of Comparative Example 1. In particular, it could be confirmed that the specific surface area of the electrode of Example 4 was 493.1 m$^2$/g, which is about 48% larger than that of the electrode which included the binder before the microwave irradiation of Comparative Example 1.

Experimental Example 2

Confirmation of binder removal by X-ray photoelectron spectroscopy (XPS) measurement of porous composite electrode.

Figure 4:
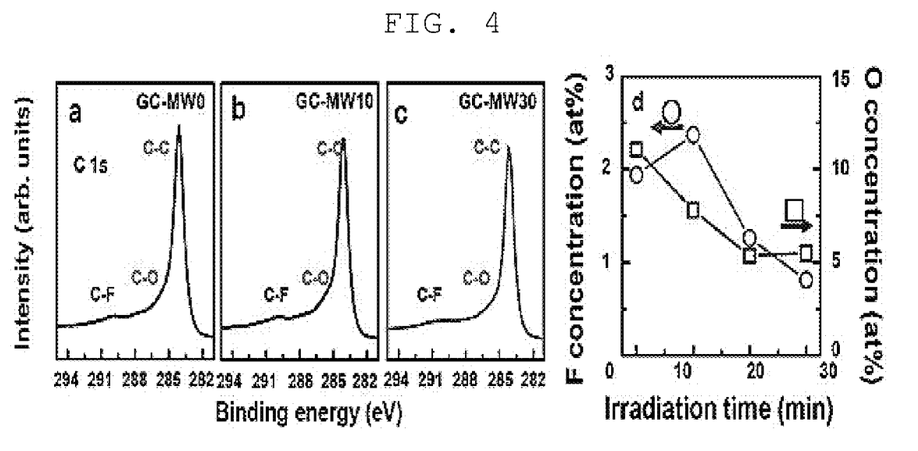
FIG. 4 is an X-ray photoelectron spectra according to an embodiment of the present invention.

As shown in FIG. 4, it was confirmed through X-ray photoelectron spectroscopy (XPS) that the binder was removed according to the irradiation intensity and the irradiation time of the microwaves by irradiating the composite electrode of embodiments of the present invention with microwaves. After irradiating the microwaves on the composite electrodes manufactured in Examples 2 and 4 and Comparative Example 1, the XPS spectra according to the irradiation time were confirmed. As shown in FIGS. 4b to 4c, a peak intensity disappeared at a binding energy (292 eV) C—F bond of polytetrafluoroethylene which is a binder after the microwave irradiation in the X-ray photoelectron spectrum, which confirmed that the binder was removed in the composite electrode of Example 2 and 4. Further, it was confirmed that the composite electrode according to the microwave irradiation of embodiments of the present invention did not cause deformation of the substrate. On the contrary, in the composite electrode of Comparative Example 1, the peak intensity appeared at the binding energy of 292 eV of the C—F bond of the polytetrafluoroethylene, which confirmed that the binder was not removed.

Further, as shown in FIG. 4d, it could be confirmed that the fluorine content decreased according to the microwave irradiation time, and the removal efficiency of the binder was better at the irradiation time of 20 to 30 minutes.

Experimental Example 3

Measurement of Capacitance Characteristics of Porous Composite Electrode

Figure 5:
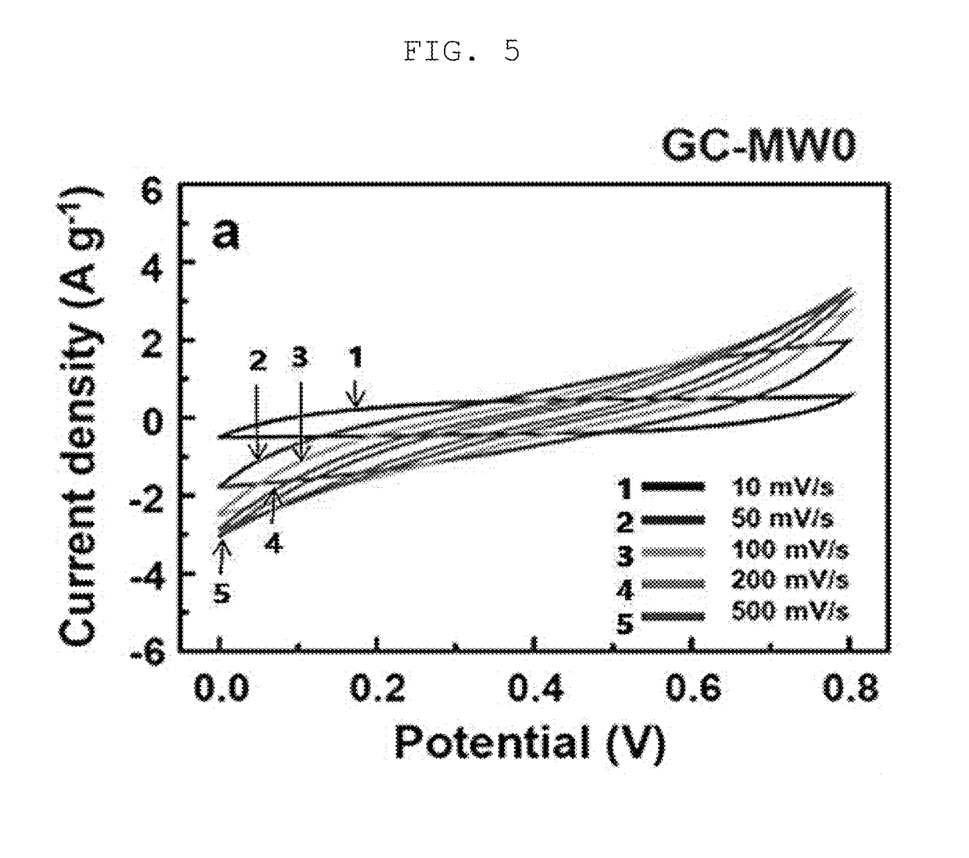
FIG. 5 shows a change in capacitance measured according to a voltage scanning rate through cyclic voltammetry (CV) before and after microwave irradiation according to Comparative Example 1.
Figure 6:
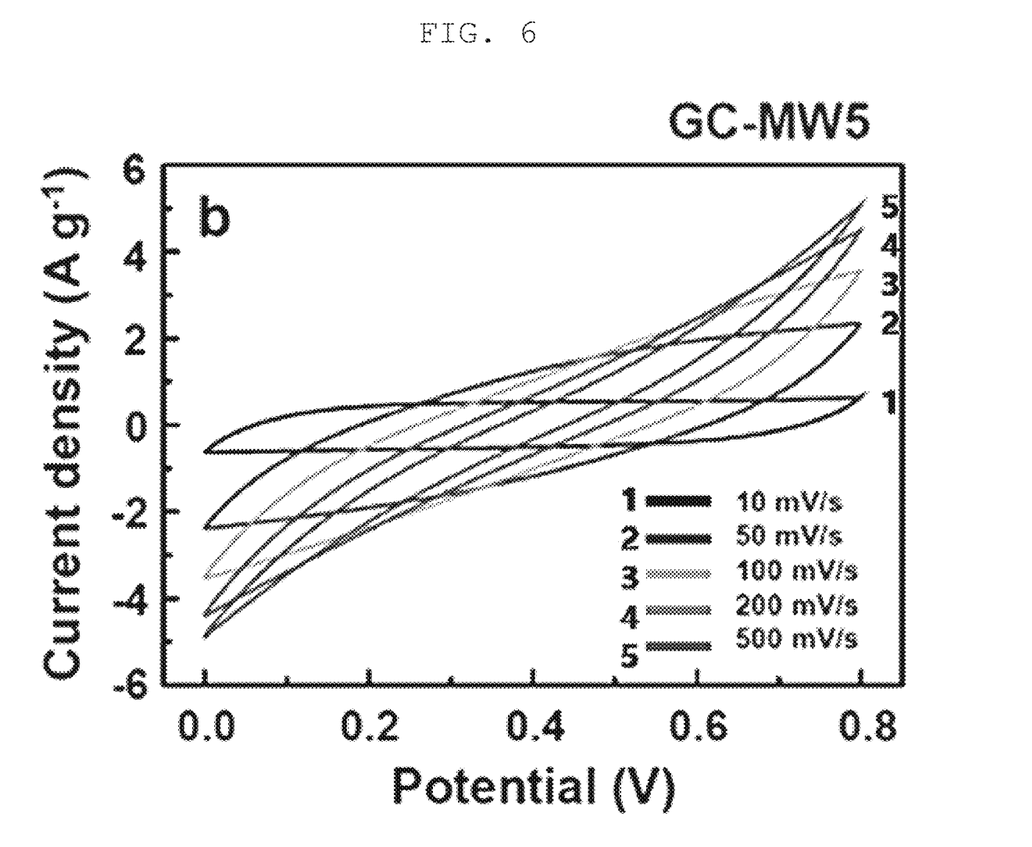
FIG. 6 shows a change in capacitance of a porous composite electrode according to Example 1, measured according to a voltage scanning rate through CV.
Figure 7:
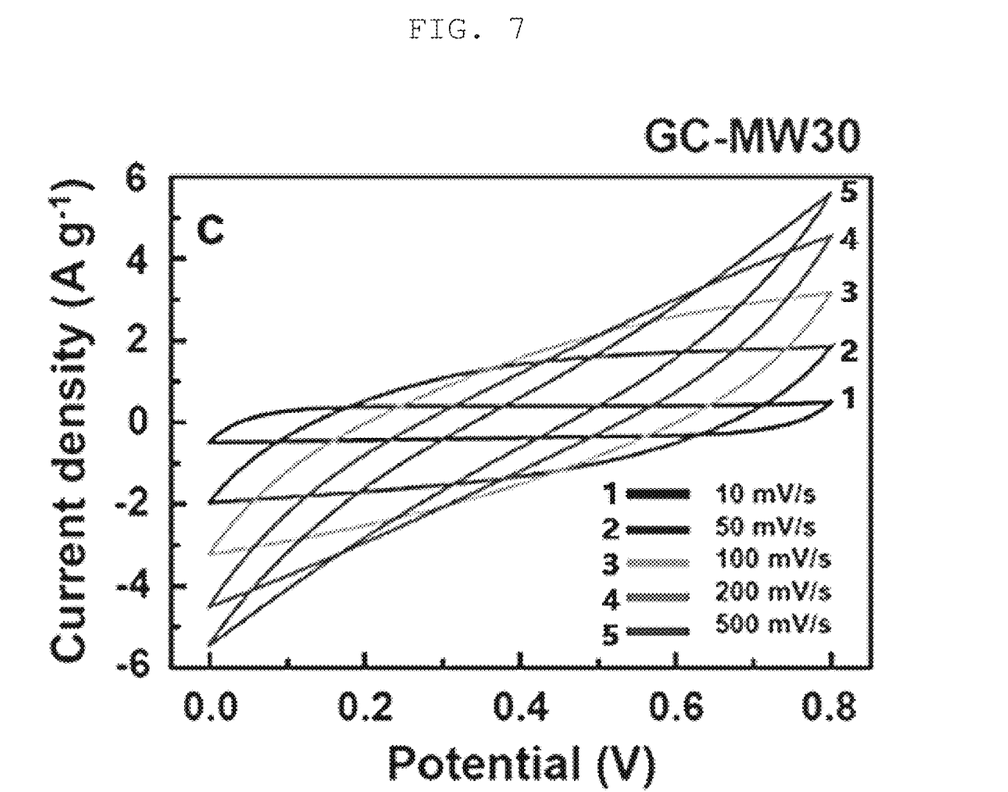
FIG. 7 shows a change in capacitance of a porous composite electrode according to Example 4, measured according to a voltage scanning rate through CV.

As shown in FIGS. 5 to 7, the capacitance of the porous composite electrodes manufactured in Examples 1 and 4 and Comparative Example 1 was measured according to the voltage scanning rate in a voltage range of 0 to 0.8 V through CV. As shown in FIGS. 5 to 7, it could be confirmed that in Examples 1 and 4, the capacitance was significantly improved as the voltage scanning rate increased. More preferably, it could be confirmed that when irradiating the microwaves as in Example 4, better capacitance was achieved. On the contrary, it could be confirmed that in Comparative Example 1, even though the voltage scanning rate increased, the capacitance was significantly low.

Figure 8:
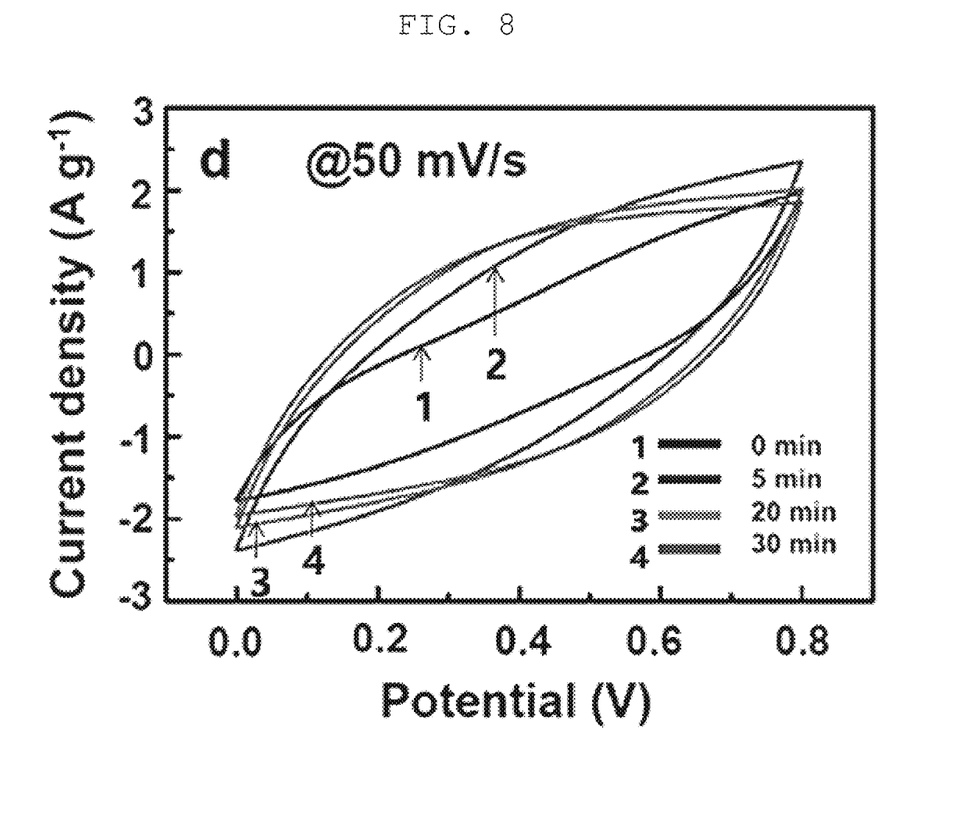
FIG. 8 shows a change in capacitance of the porous composite electrode according to Examples and Comparative Examples, measured according to microwave irradiation time.

Further, as shown in FIG. 8, it could be confirmed that when the porous composite electrodes of Examples and Comparative Example were measured at a rate of 50 mV/s in a potential range of 0 to 0.8 V, the capacitance of Example was remarkably higher than that of Comparative Example 1 in which no microwave was irradiated.

Figure 9:
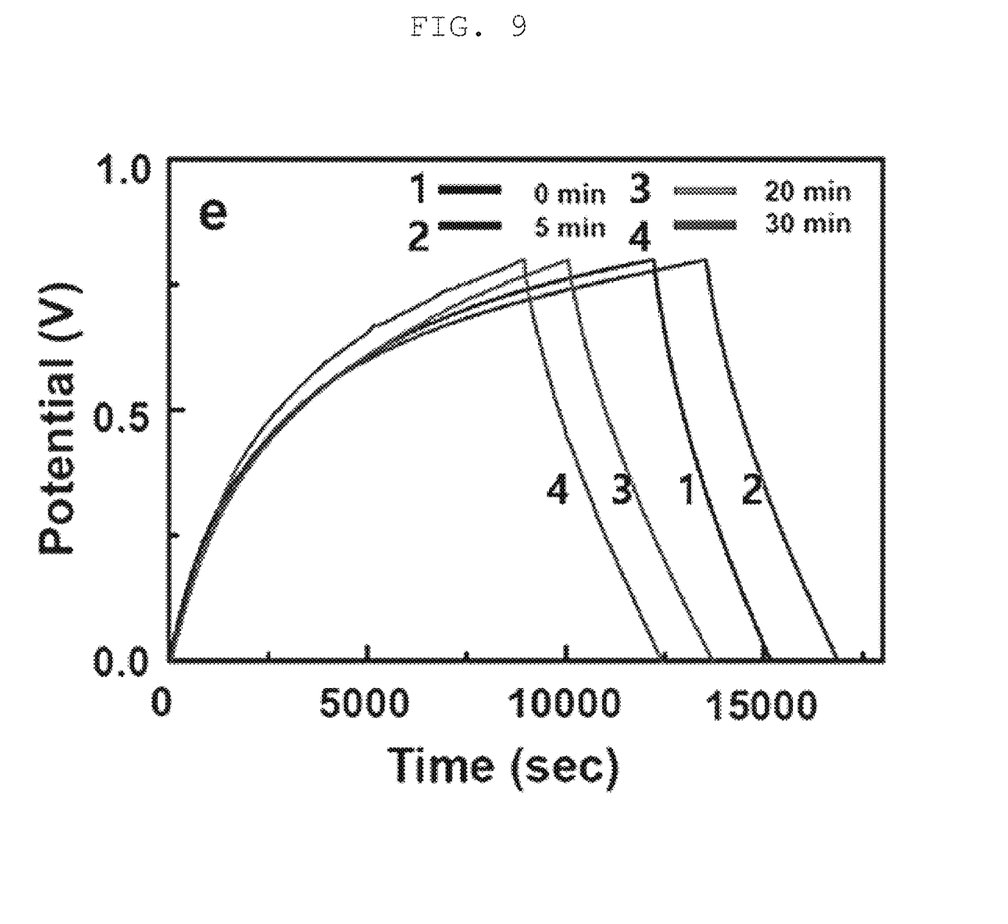
FIG. 9 shows results of charging and discharging rates of the porous composite electrodes according to Examples and Comparative Examples.

Further, as shown in FIG. 9, the charging and discharging time of the porous composite electrodes manufactured in Examples 1, 3 and 4 and Comparative Example 1 were confirmed, and it could be confirmed that as the charging and discharging time was shortened, and that the porous composite electrodes of Examples 1, 3 and 4 had improved capacitance. More preferably, as the microwave irradiation time increased, preferably, when the microwave irradiation time was 20 to 30 minutes, it could be confirmed better charging and discharging rates were obtained.

Figure 10:
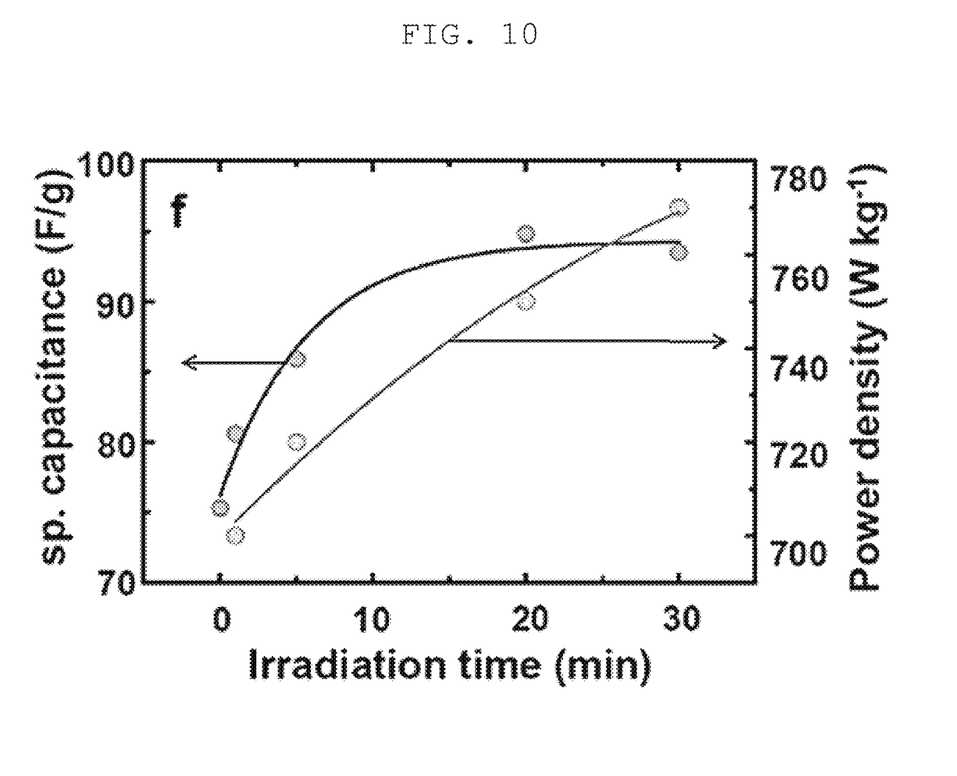
FIG. 10 shows a power density and capacitance of the porous composite electrodes according to Examples and Comparative Examples, measured according to the microwave irradiation time.

Further, as shown in FIG. 10, in the case of confirming the power density and capacitance according to the microwave irradiation time with the porous composite electrodes manufactured in Examples 1, 3 and 4 and Comparative Example 1, it could be confirmed that as the microwave irradiation time increased, preferably, when the microwave irradiation time was to 30 minutes, better electrical characteristics were obtained.

Therefore, the porous composite electrode of embodiments of the present invention is applicable to a super capacitor due to excellent electrical characteristics.

Experimental Example 4

Confirmation of sensitivity to gas sensor.

As Example 5, a gas sensor was manufactured, the gas sensor including the porous composite electrode manufactured by using the composite of carbon nanotubes and multi-layer graphene complexed with platinum instead of the carbon material in Example 1. In addition, as Comparative Example 2, a gas sensor was manufactured, the gas sensor including the porous composite electrode manufactured by using the same material as that of the above-described Example 5 and performing the heat treatment at 200☐ for 1 hour without microwave irradiation.

Here, in the porous composite electrodes manufactured in Example 5 and Comparative Example 2, current-voltage characteristics before and after exposure to the target gas and a sensing reaction for each concentration at room temperature were measured using carbon monoxide as a target gas.

In Example 5, it was confirmed in Example 5 that when the gas sensor was exposed to the target gas, sensing characteristics improved as a slope increased based on the increase in current. Further, when the exposure to the gas was stopped, there was little change in sensitivity in the gas sensor. Thus, it was confirmed that the gas sensor of Example 5 has excellent sensitivity and stability in repeated exposure of the target gas.

On the contrary, in Comparative Example 2, the substrate was deformed by the heat treatment, causing reduction of a size and a thickness of the electrode, and thus gas sensing capacity was lowered while reducing gas permeability. In addition, it was confirmed that the increase in current was not significant, and there was not a large difference in sensitivity between when the exposure was stopped and when the exposure was performed. Therefore, it was confirmed that the sensitivity of Comparative Example 2 was significantly lowered.

Thus, the porous composite electrode manufactured through the microwave irradiation according to embodiments of the present invention not only may have excellent gas sensitivity but also may exhibit stable sensitivity in repeated gas exposure environments, thereby being applicable as a gas sensor.

In the porous composite electrode according to embodiments of the present invention, the binder may be effectively and selectively removed without deformation of the substrate through a selective energy absorption process of the composite electrode by the microwave irradiation instead of a heat treatment process, and the manufacturing time may be remarkably shortened.

In addition, the porous composite electrode according to embodiments of the present invention may be processed at a low temperature or a room temperature using the microwaves, and the electrical conductivity, capacitance, and specific surface area thereof may be improved by removing the binder.

In addition, even though the binder is removed by irradiating the composite electrode with microwaves, the porous composite electrode may have excellent fixation and close adhesion due to excellent binding between the substrate and the porous composite electrode, and thus it is possible to prevent the porous composite electrode from being broken.

As described above, the method of manufacturing a porous composite electrode and the method of removing an organic material of a porous composite electrode in embodiments of the present invention have been described through the specified matters and the limited Examples. However, these descriptions have been provided only for more general understanding of the present invention, and the present invention is not limited to these Examples. Thus, it will be understood by those skilled in the art that various modifications and changes may be made from these descriptions.

Therefore, the spirit of the present invention should not be limited to the above-described embodiments, and the following claims as well as all modified equally or equivalently to the claims are intended to fall within the scopes and spirits of the invention.

What is claimed is:

1. A method of manufacturing a porous carbon composite electrode, the method comprising:
    a) preparing an ink including a solvent, a binder and two or more porous carbon materials; selected from the group consisting of single-walled carbon nanotubes, multi-walled carbon nanotubes, single-layer graphene and multi-layer graphene;
    b) coating a porous metal foam substrate with the ink to provide an intermediate product comprising an ink layer on the porous metal foam substrate, and drying the ink layer to remove the solvent;
    c) irradiating microwaves onto the ink layer to selectively remove the binder without deforming the porous metal foam substrate and the two or more porous carbon materials to provide the porous composite electrode comprising a porous carbon layer on the porous metal foam substrate; and
    d) removing the porous metal foam substrate with a metal etching solution, thereby forming the porous carbon composite electrode consisting of a composite of the two or more porous carbon materials;
    wherein the binder is at least one selected from the group consisting of polytetrafluoroethylene, polyvinylidene fluoride and polypyrrole.

2. The method of claim 1, wherein in the c) irradiating of the composite electrode, the microwaves are irradiated at 600 to 1,000 W.

3. The method of claim 1, wherein in the c) irradiating of the composite electrode, the microwaves are irradiated for 1 to 60 minutes.

4. The method of claim 1, wherein the ink further comprises a solvent.

5. The method of claim 1, wherein each of the porous carbon materials has a pore size of 0.3 to 5 nm.

6. The method of claim 1, wherein the metal foam is at least one selected from the group consisting of nickel foam, copper foam, aluminum foam and titanium foam.

7. The method of claim 1, wherein each of the porous carbon material in the ink has a specific surface area of 400 to 2,000 $m^2/g$.

8. The method of claim 1, wherein the binder is at least one selected from the group consisting of polytetrafluoroethylene and polyvinylidene fluoride.

* * * * *

UNITED STATES PATENT AND TRADEMARK OFFICE
CERTIFICATE OF CORRECTION

PATENT NO. : 11,043,338 B2
APPLICATION NO. : 16/186357
DATED : June 22, 2021
INVENTOR(S) : Sun Sook Lee et al.

It is certified that error appears in the above-identified patent and that said Letters Patent is hereby corrected as shown below:

In the Specification

In Column 5 at Line 63, change "subsrate." to --substrate.--.

In Column 6 at Line 33, change "1000" to --100° C.--.

In Column 8 at Line 56, change "50☐" to --50° C.--.

In Column 8 at Line 59, change "Hanhwa" to --Hanwha--.

In Column 9 at Line 5, change "90☐" to --90° C.--.

In Column 9 at Line 45, change "Barret" to --Barrett--.

In Column 10 at Line 63, change "to 30" to --20 to 30--.

In Column 11 at Lines 13, change "200☐" to --200° C.--.

Signed and Sealed this
Twenty-eighth Day of June, 2022

Katherine Kelly Vidal
*Director of the United States Patent and Trademark Office*